Figure 1:
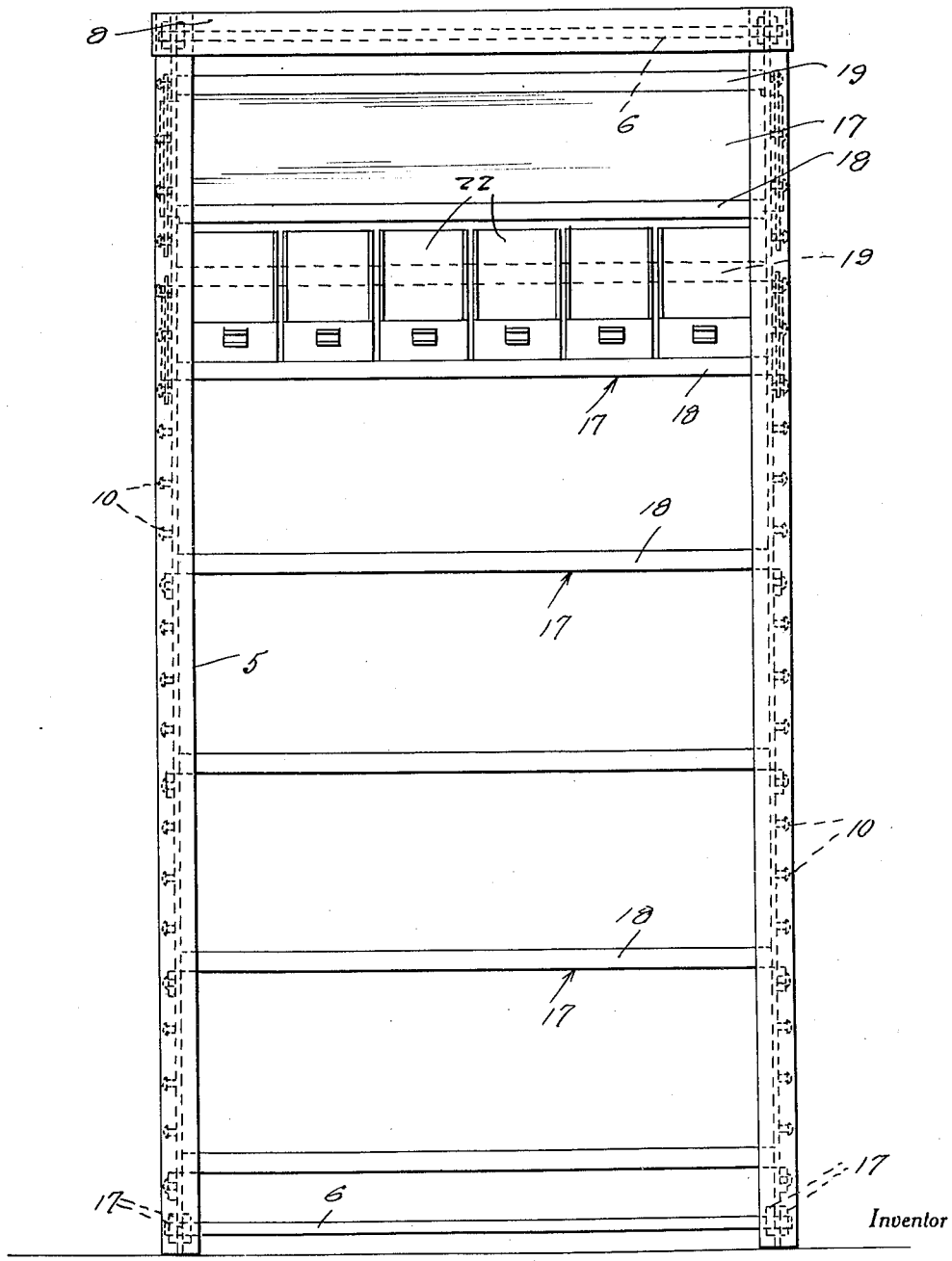

Sept. 6, 1932.   P. A. RUDDY   1,876,172
DISPLAY RACK
Filed July 7, 1930   5 Sheets-Sheet 1

Inventor
P. A. Ruddy
By Clarence A. O'Brien
Attorney

Sept. 6, 1932.   P. A. RUDDY   1,876,172
DISPLAY RACK
Filed July 7, 1930   5 Sheets-Sheet 2
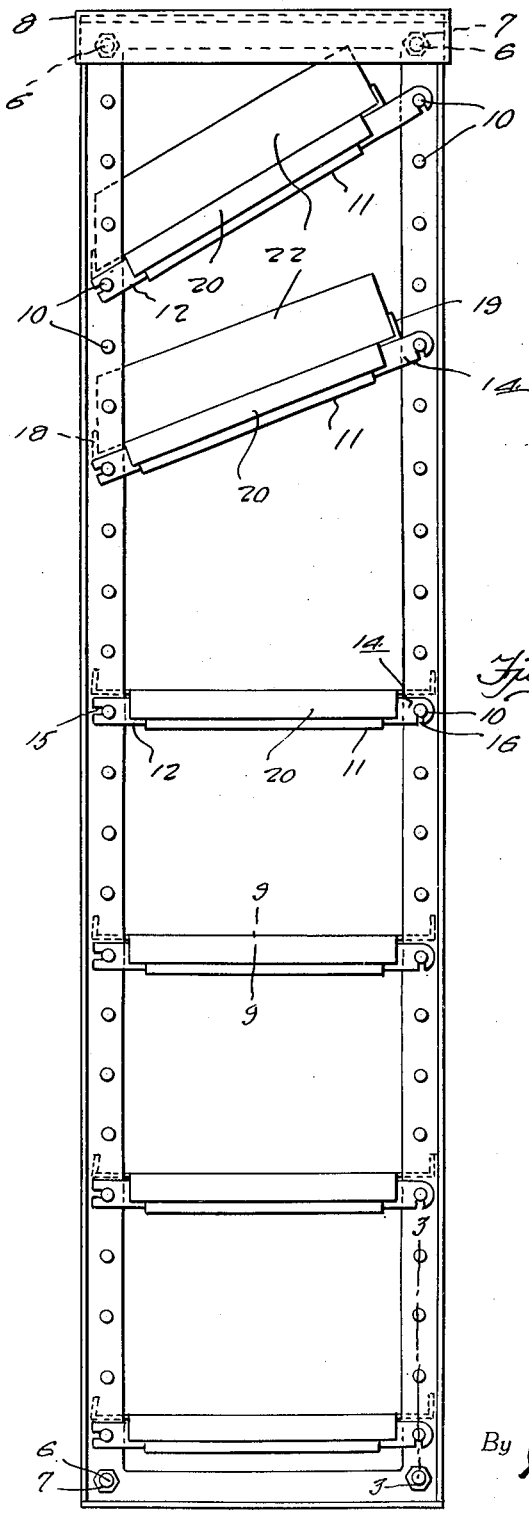
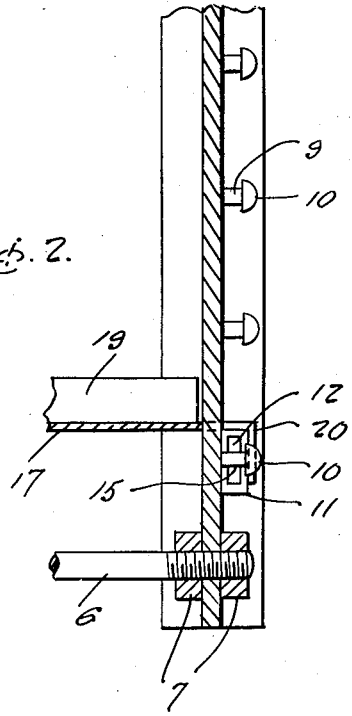
Inventor
P. A. Ruddy
By Clarence A. O'Brien
Attorney

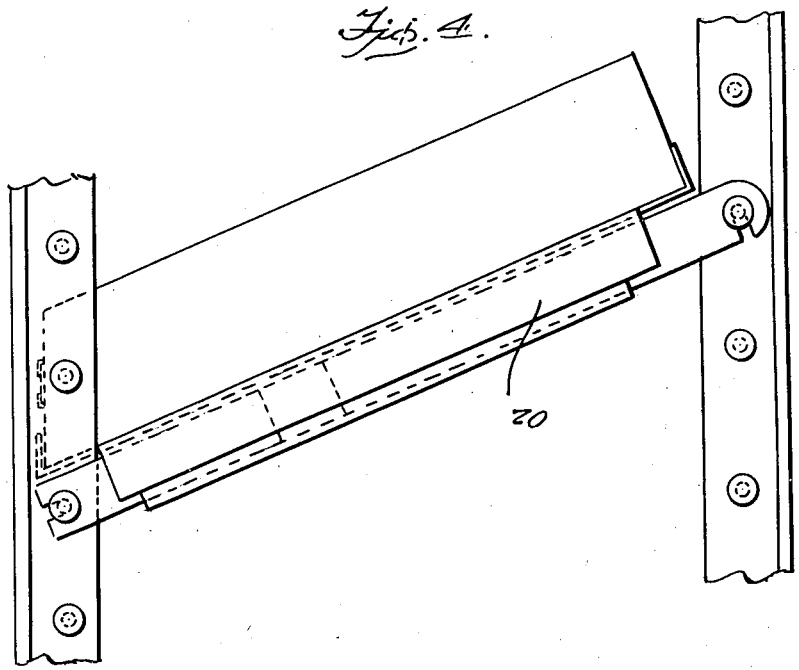
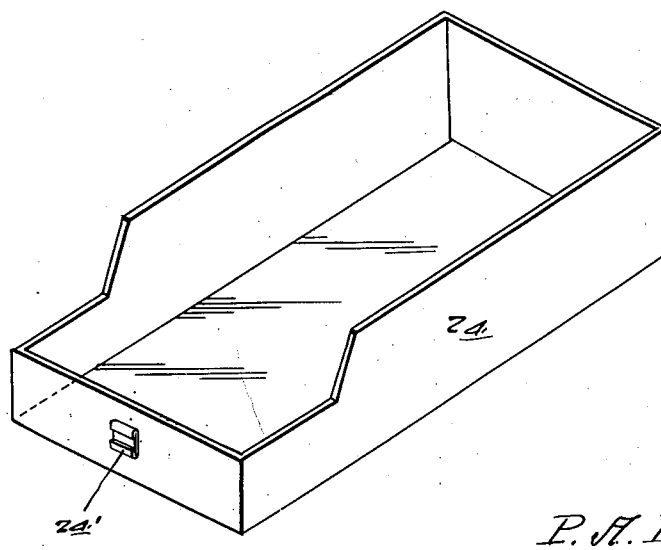

Sept. 6, 1932.    P. A. RUDDY    1,876,172
DISPLAY RACK
Filed July 7, 1930    5 Sheets-Sheet 4

Inventor
P. A. Ruddy

By Clarence A. O'Brien
Attorney

Sept. 6, 1932.   P. A. RUDDY   1,876,172
DISPLAY RACK
Filed July 7, 1930   5 Sheets-Sheet 5
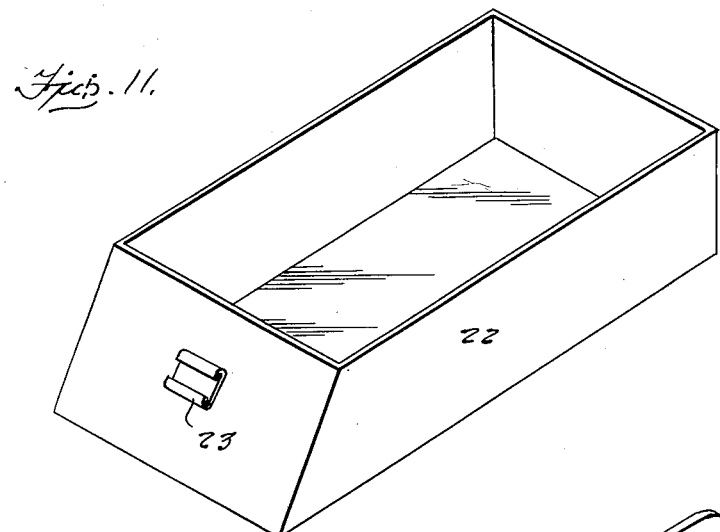
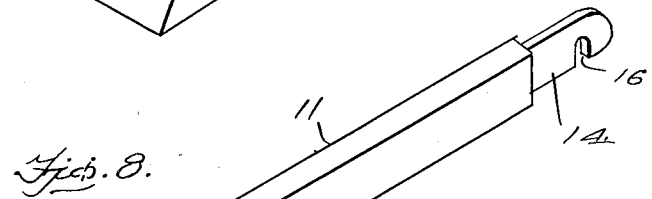
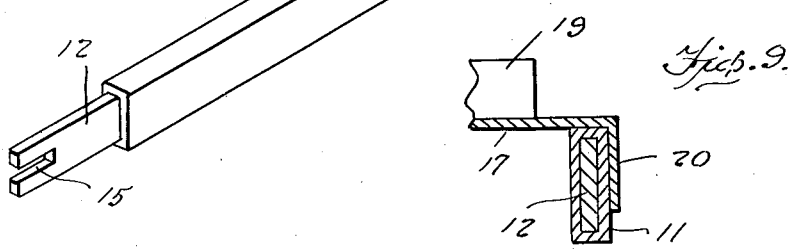
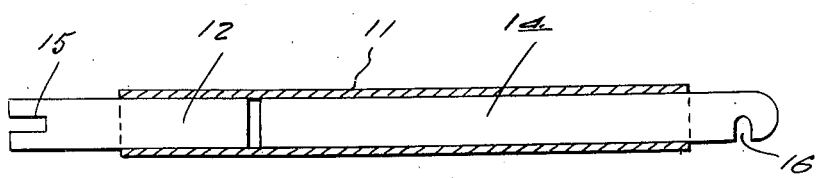
Inventor
P. A. Ruddy
By Clarence A. O'Brien
Attorney Patented Sept. 6, 1932

1,876,172

UNITED STATES PATENT OFFICE

PATRICK A. RUDDY, OF DUNMORE, PENNSYLVANIA

DISPLAY RACK

Application filed July 7, 1930. Serial No. 466,281.

The present invention relates to a display rack and has for its prime object to provide a rack of this nature whereby it is possible to make quick changes in the display therein.

Another very important object of the invention resides in the provision of a rack of this nature which may be manufactured at a low cost, which may be assembled or dismounted quickly and with a very few light operations and which is strong and durable in construction, compact and convenient in its arrangement of parts, easy to manipulate, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 5:
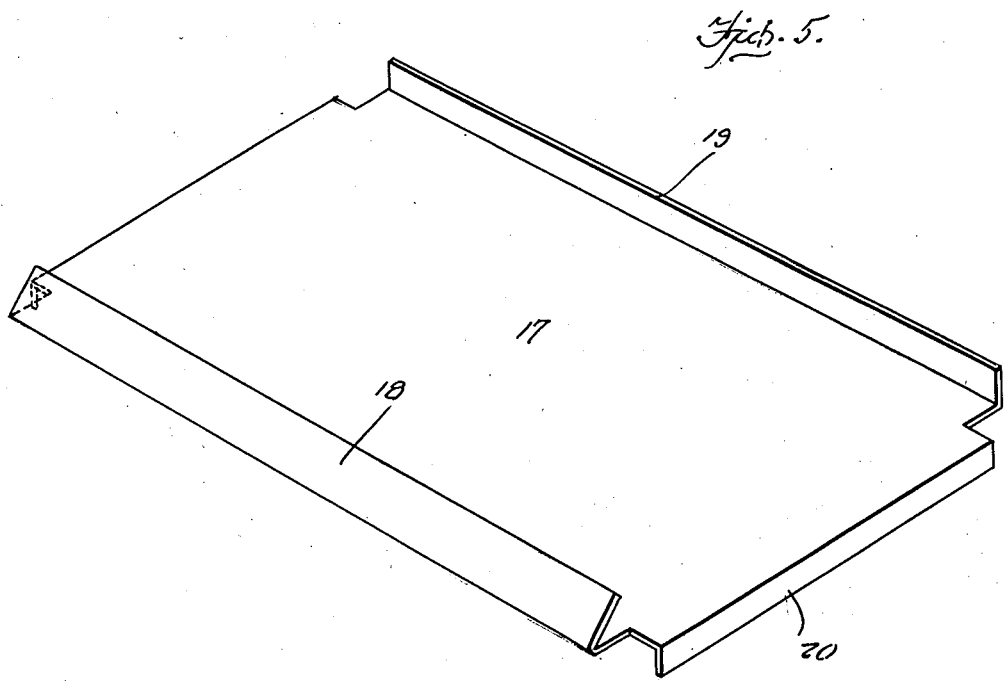
Figure 6:
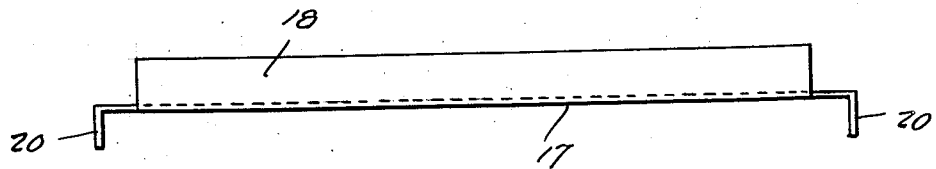
Figure 7:
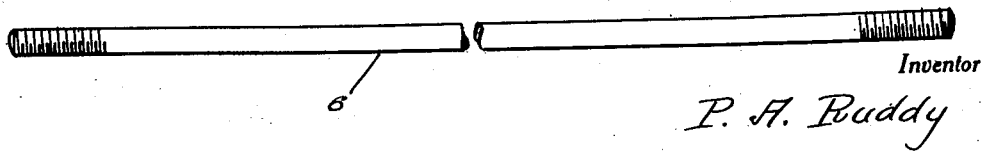

In the drawings:

Figure 1 is a front elevation of a display rack embodying the features of my invention, Figure 2 is a side elevation thereof, Figure 3 is an enlarged detail section taken substantially on the line 3—3 of Figure 2, Figure 4 is an enlarged detail side elevation showing one of the shelves and containing pans in place, Figure 5 is a perspective view of one of the shelves, Figure 6 is a front elevation thereof, Figure 7 is a detail elevation of one of the rods, Figure 8 is a perspective view of one of the adjustable shelf rests, Figure 9 is a detail section taken substantially on the line 9—9 of Figure 2, Figure 10 is a longitudinal section through one of the shelf rests, Figure 11 is a perspective view of one of the angular closed face containing pans, and Figure 12 is a perspective view of one of the open face containing pans.

Referring to the drawings in detail it will be seen that numerals 5 denote a pair of vertically disposed rectangular frames held in spaced relationship by the tie rods 6. A pair of nuts 7 is disposed on each end of each tie rod to receive portions of the frame therebetween. These nuts may be adjusted to vary the distance between the frames. A cap frame 8 is disposed over the tops of the vertical frame 5.

From the sides of the vertical frames there projects outwardly a plurality of lugs 9 having heads 10 on the outer ends thereof. These lugs are arranged in vertical series as is clearly illustrated in Figure 2.

A plurality of shelf rests are provided for the rack. Each shelf rest comprises a rectangular sleeve having arranged in one end thereof a relatively short bar 12 welded or otherwise integral with said sleeve. A relatively long bar 14 is slidable in the opposite end of said sleeve.

The bar 12 has in its outer terminal a notch 15 to receive a lug 9 on the front rail of a frame while the under edge of the outer end of the bar 14 is provided with a notch 16 to receive one of the lugs 9 on the rear rail of a frame. Thus these rests may be controlled at any desired angle as will be clearly appreciated from an inspection of Figure 2.

On a pair of the shelf rests is supported a shelf comprising a body 17 having a front flange 18 rising therefrom and inclining upwardly and rearwardly and a right angularly upstanding rear flange 19. Side flanges 20 depend therefrom so as to overhang the rest as is clearly illustrated in Figure 9.

On these shelves 17 may be mounted either angular closed face containing pans 22 with tag holders 23 on the front faces thereof or open face containing pans 24, with tag holders 24' on the front wall thereof. Of course the shelves may be used without the pans or the shelves may be used to support other paraphernalia. In the use of the containing pans, it is of course to be understood that both the closed and open face containing pans may be of such width relative to one another that two smaller pans of the same dimension in every respect except width might be inserted on a shelf when necessary to fill in the space formerly occupied by one pan of greater width.

It is thought that the construction, utility, manipulation and advantages of this invention will now be quite apparent to those skilled in this art without a more detailed description thereof.

The present embodiment of the invention has been disclosed in considerable detail merely for the purposes of exemplification since in actual practice, it attains the features of advantage enumerated as desirable in the statement of the invention and the above description.

It is apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A rack comprising, a pair of end frames, having a plurality of lugs attached thereto, slidably adjustable shelf rests engaging said lugs, each shelf rest comprising a sleeve having bars mounted therein, the ends of the bars being notched to receive the lugs formed on the frames and a shelf adapted to support a plurality of pans thereon, associated with the adjustable rests, said shelf having a body portion provided with side flanges overhanging the rests, and a retaining flange at the front of the body portion adapted to retain the pans on the shelf when the shelf is adjusted at a positive angle to the horizontal.

2. A rack comprising a pair of end frames, formed of angle iron and having a plurality of lugs attached to one of the legs forming the angle portion, said frames being spaced apart, with the angle portion facing outwardly, slidably adjustable shelf rests engaging with the lugs formed on the frames and shelves associated with the adjustable rests, adapted to support a plurality of pans thereon.

3. A rack comprising a pair of end frames, formed of angle iron and having a plurality of lugs attached to one of the legs forming the angle portion, said frames being spaced apart, with the angle portions facing outwardly and held in parallel relationship by means of rods secured to the ends of the frames, slidably adjustable shelf rests engaging with the lugs formed on the frames, and a shelf adapted to support a plurality of pans thereon, comprising a body portion having side flanges overhanging the adjustable rests, a pan retaining flange at the front of the body portion adapted to retain the pans on the shelf when the shelf is adjusted at a positive angle to the horizontal.

4. A rack comprising, a pair of end frames formed of angle iron and having a plurality of lugs attached to one of the legs forming the angle portion, said frames being spaced apart with the angle portion facing outwardly and held in parallel relationship by means of the rods secured to the ends of the frames, slidably adjustable shelf rests engaging the lugs attached to the end frames, each shelf rest comprising a sleeve having bars mounted therein, the ends of the bars being notched to receive the lugs formed on the frames and a shelf associated with the adjustable rests, said shelf having a body portion provided with side flanges overhanging the shelf rests.

5. A rack comprising, a pair of end frames formed of angle iron and having a plurality of lugs attached to one of the legs forming the angle portion, said frames being spaced apart, with the angle portions facing outwardly and held in parallel relationship by means of rods secured to the ends of the frames, slidably adjustable shelf rests engaging said lugs formed on the end frames, each shelf rest comprising a sleeve having bars mounted therein, the ends of the bars being notched to receive the lugs formed on the frames and a shelf adapted to support a plurality of pans thereon, associated with the adjustable rests, said shelf having a body portion provided with side flanges overhanging the rests, and retaining flanges at the front and rear of the body portion adapted to retain the pans on the shelf when the shelf is adjusted at an angle to the horizontal.

In testimony whereof I affix my signature.

PATRICK A. RUDDY.